Dec. 30, 1969 C. A. EGGERT 3,487,164
DISPLAY APPARATUS DEFLECTION SIGNAL CORRECTION SYSTEM
WITH SIGNAL MULTIPLICATION
Filed Jan. 20, 1967 4 Sheets-Sheet 1

INVENTOR.
CARL A. EGGERT
BY Lindenberg + Freilich
ATTORNEYS

INVENTOR.
CARL A. EGGERT
BY Lindenberg & Freilich
ATTORNEYS

INVENTOR.
CARL A. EGGERT
BY Lindenberg + Freilich
ATTORNEYS

INVENTOR.
CARL A. EGGERT
BY Lindenberg + Freilich
ATTORNEYS 3,487,164

DISPLAY APPARATUS DEFLECTION SIGNAL CORRECTION SYSTEM WITH SIGNAL MULTIPLICATION

Carl A. Eggert, Canoga Park, Calif., assignor to The Bunker-Ramo Corporation, Canoga Park, Calif., a corporation of Delaware Filed Jan. 20, 1967, Ser. No. 610,614
Int. Cl. H04n *3/16*
U.S. Cl. 178—7.5 6 Claims

ABSTRACT OF THE DISCLOSURE

Means for correcting for inaccuracies in the major and minor positioning of a cathode ray tube beam which may result from (1) an off-axis gun, and (2) a difference between the radius of curvature of the tube face and the effective beam length. Unique analog multiplication means are utilized for continually developing correction signals in response to applied vertical and horizontal analog major and minor positioning signals in order to compensate for distortions which would be otherwise introduced due to the tube geometry.

BACKGROUND OF THE INVENTION

Field of the invention

This invention relates generally to display apparatus, as for example, of the cathode ray tube (CRT) type, and more particularly to means for correcting for inaccuracies in the major and minor positioning of the CRT beam.

It has long been recognized that inaccuracies in the major positioning of a CRT beam will result if a difference exists between the radius of curvature of the CRT face and the length of the beam; i.e., substantially the distance from the deflection means to the face. Although these inaccuracies could be eliminated by equating the radius of curvature to the beam length, to do so would require either an excessively long tube neck or an excessively spherical face. These inaccuracies are often referred to as pin cushion distortion inasmuch as uncorrected positioning signals nominally defining a rectangle will produce a pin cushion like image in which all of the sides are bowed toward the center and the corners are stretched outwardly from the center.

As the state of the art of data processing equipment has continued to progress, more sophisticated and complex applications have evolved which in turn have demanded still more sophisticated equipment. Thus, a requirement has arisen for a device in which electronically represented data can be displayed in proper registration with respect to optically represented data such as a photograph. In the fulfillment of this requirement, CRT's have been developed having a port or window therein which permits the optically represented data, e.g., a map, to be displayed on the tube face while electronically represented data, e.g., specific locations on the map, are simultaneously displayed on the tube face by beam action. Inasmuch as it is virtually impossible to have both the port and the electron beam producing gun on the tube axis, it is necessary to position at least one off-axis and then correct for the distortion thus introduced in order to achieve registration. By positioning the gun off-axis, a keystone distortion is introduced.

Description of the prior art

In many known prior art systems, attempts have been made to empirically correct any positioning distortions which arise. However, as a general rule these distortions although reduced are tolerated.

SUMMARY OF THE INVENTION

In accordance with a first aspect of the present invention keystone distortion in the major positioning of a CRT beam due to an off-axis electron gun is substantially eliminated through the use of a correction signal developed by an analog multiplication means. In accordance with a further aspect of the present invention, pin cushion distortion in the major positioning of a CTR beam due to the radius of curvature of the tube face is likewise reduced through the proper utilization of a correction signal developed by analog multiplication means. Still further, distortion in the minor positioning of the CRT beam is substantially eliminated through the use of multiplication means.

Briefly, in accordance with the present invention, keystone and pin cushion distortion is substantially eliminated by developing corrected deflection signals from the input major positioning signals. The amount of correction required depends upon the coordinate position defined by the major positioning signals. Thus, for example, as will be shown herein, the amount by which the horizontal major positioning signal must be modified for any particular point depends upon the product of the coordinates defining that point. Therefore, in accordance with the present invention an analog multiplier is provided to develop corrected deflection signals from applied major positioning signals. The off-axis gun giving rise to keystone distortion in the major positioning of the beam gives rise to similar distortion in the minor movements of the beam required to draw symbols, for example. This minor distortion can also be compensated for by the utilization of multiplication means.

In the preferred embodiment of the invention the major signal analog multiplier comprises a differential amplifier having a variable impedance feedback loop coupled to one of the input terminals. If the off-axis gun is displaced from the horizontal tube axis, the keystone distortion will be symmetric about the vertical tube axis. In this situation the vertical major positioning signal can be applied to a first input terminal of the differential amplifier with the horizontal major positioning signal being utilized to control the variable impedance in the feedback loop thus effectively controlling the gain of the differential amplifier. In this manner, a correction signal is developed which is used to modify the horizontal major positioning signal to compensate for the keystone distortion. In addition, the correction signal developed by the major signal analog multiplier can be utilized to correct the vertical major positioning signal for pin cushion distortion inasmuch as the amount of major vertical correction required at any point is dependent upon the value of both the major horizontal and vertical coordinates at this point.

A minor signal multiplication means in accordance with the preferred embodiment of the invention utilizes a variable impedance, preferably a field effect transistor, operated at low bipolar drain potential levels.

BRIEF DESCRIPTION OF THE INVENTION

Figure 1:
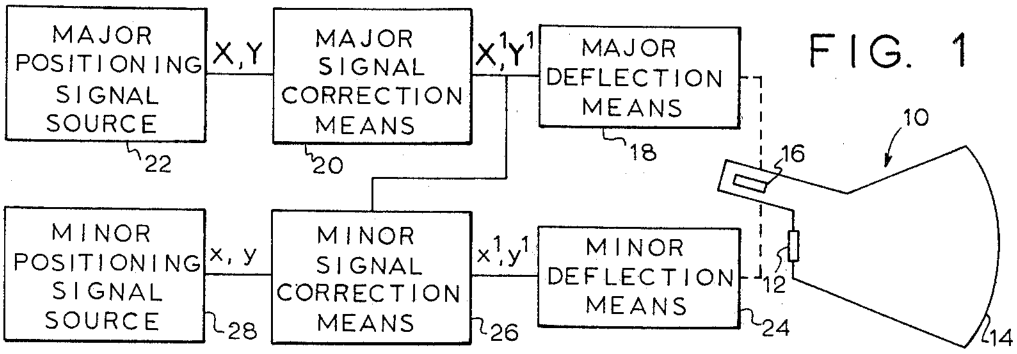
FIGURE 1 is a schematic block diagram illustrating a display system employing a ported CRT having an off-axis gun.
Figure 2:
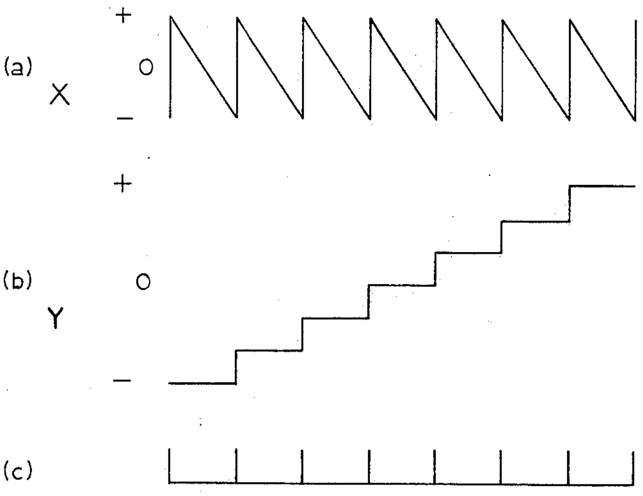
FIG. 2 illustrates vertical and horizontal major positioning signals together with a beam blanking signal intended to produce a display comprised of a plurality of parallel vertically spaced horizontal lines on the face of the tube of FIG. 1.
Figure 3:
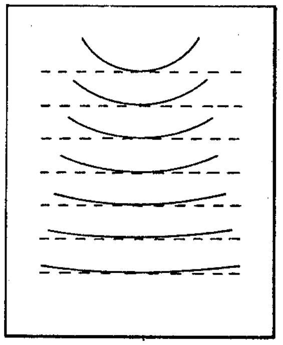
FIG. 3 illustrates the major distortion introduced by the off-axis gun and face curvature of the tube of FIG. 1.
Figure 4:
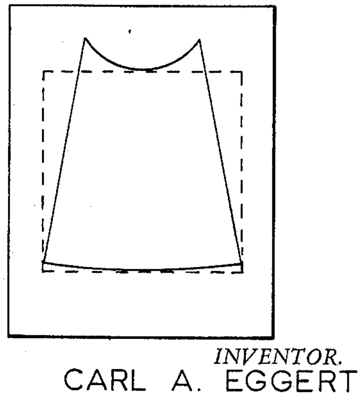
Figure 5:
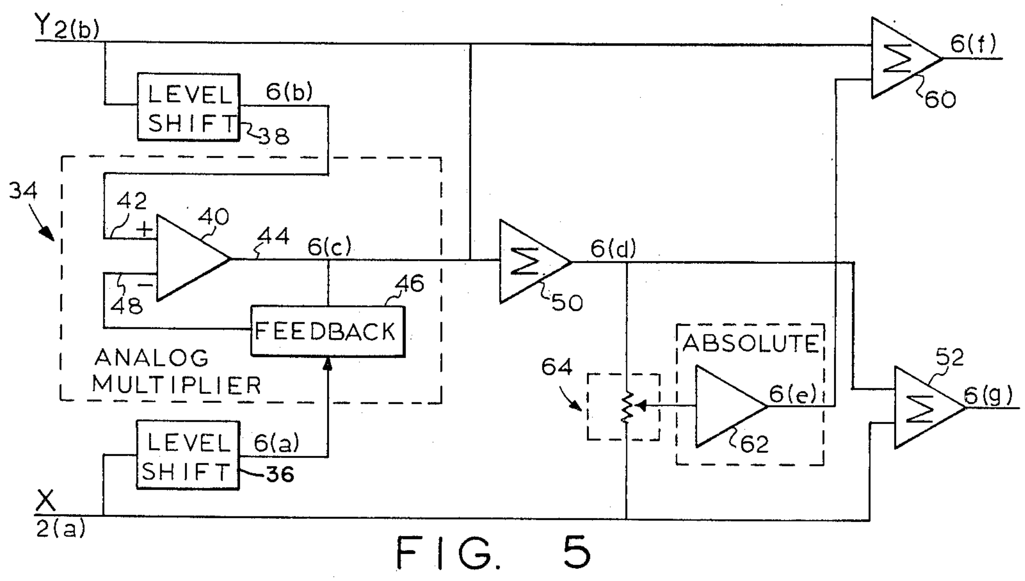
Figure 6:
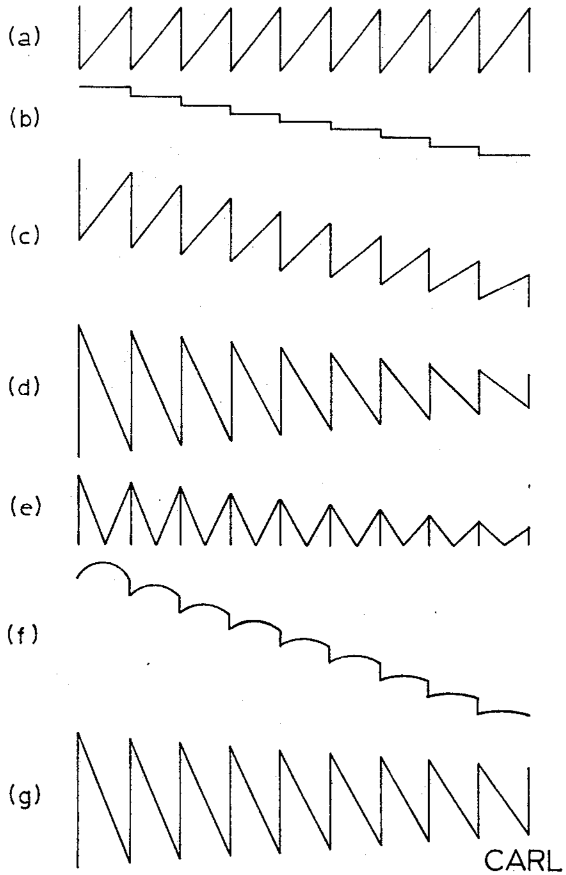
Figure 7:
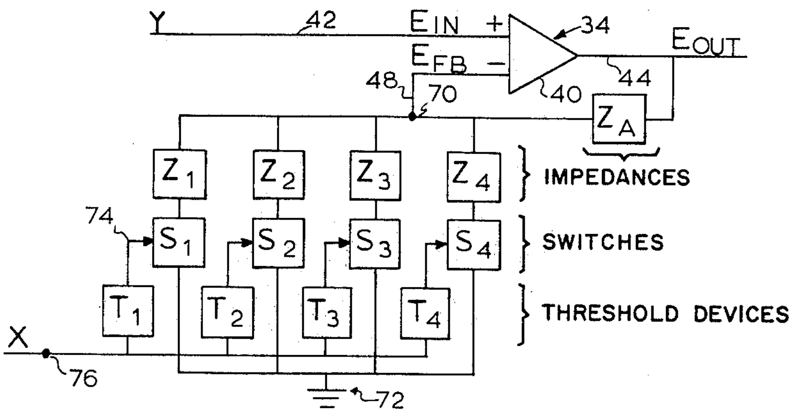
Figure 8:
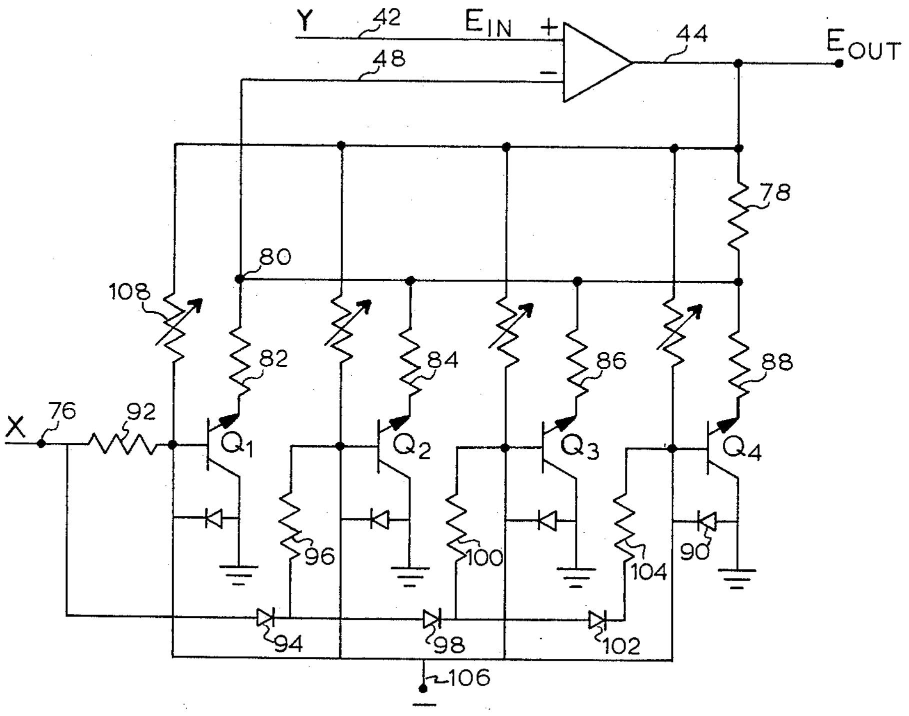
Figure 9:
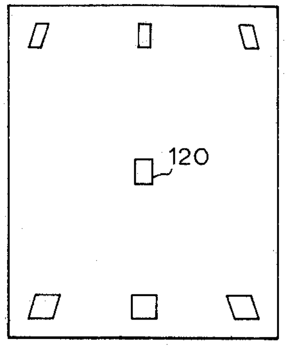

FIG. 4 further illustrates the major distortion resulting from the application of uncorrected major positioning signals to the tube of FIG. 1;

FIG. 5 is a schematic block diagram illustrating a correction means in accordance with the present invention responsive to major positioning signals as shown in FIG. 2 for providing corrected deflection signals for substantially eliminating the pin cushion and keystone effects illustrated in FIGS. 3 and 4;

FIG. 6 illustrates a plurality of waveforms depicting signals occurring at various points in the system of FIG. 5 in response to the positioning signals of FIG. 2;

FIG. 7 is a block diagram of a preferred form of a major signal analog multiplier in accordance with the present invention;

FIG. 8 is a block schematic diagram illustrating a preferred embodiment of the major signal analog multiplier shown in FIG. 7;

FIG. 9 illustrates the minor distortion due primarily to the off-axis gun; and

Figure 10:
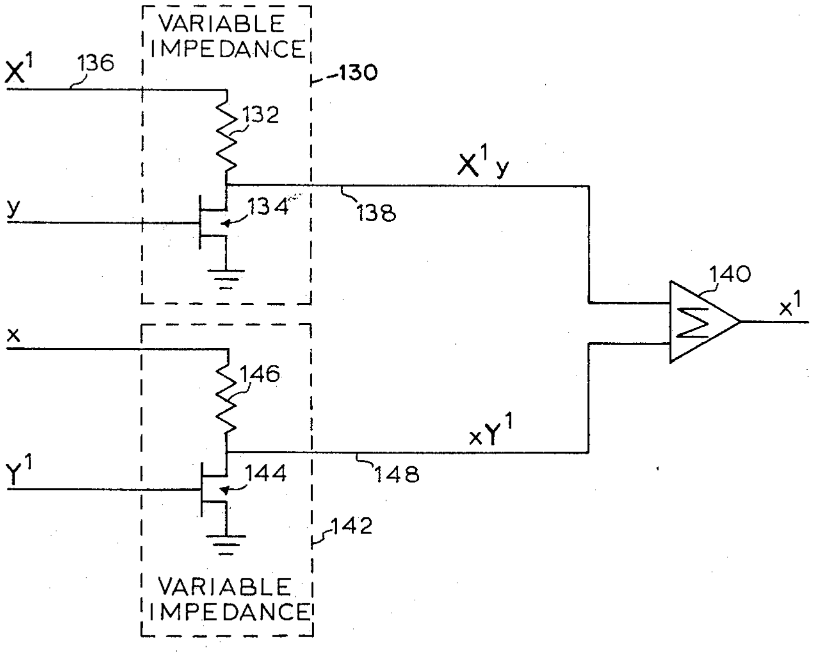

FIG. 10 is a block schematic diagram illustrating the minor positioning signal correction means.

DESCRIPTION OF THE PREFERRED EMBODIMENT

Attention is now called to FIG. 1 which illustrates a cathode ray tube (CRT) 10 having a window or port 12 positioned substantially coincident with the vertical and horizontal axes of the tube. The port 12 is provided to enable optically represented data, such as a photographic image of a map, to be projected through the port 12 onto the inner surface of the tube face 14. The tube 10, in addition, includes an electron beam producing gun 16 which, of course, cannot be physically positioned coincident with the vertical and horizontal tube axes due to the presence of the port 12. The gun 16 must therefore be positioned off-axis and is illustrated as being positioned above the horizontal tube axis but substantially coincident with the vertical tube axis.

In accordance with the invention, the major deflection or gross positioning of the CRT beam is controlled by the major deflection means 18, e.g., a magnetic yoke, which is responsive to corrected vertical (Y′) and horizontal (X′) deflection signals applied thereto. The corrected deflection signals (X′ and Y′) are provided by a major signal correction means 20 which is responsive to uncorrected major positioning signals (X and Y) applied thereto by a major positioning signal source 22. As will be shown hereinafter, if the uncorrected X and Y major positioning signals were applied directly to the major deflection means 18 without being corrected by the correction means 20, significant inaccuracies in the beam position would result.

Whereas the major deflection means 18 establish the gross position of the CRT beam, the minor deflection means 24 controls the movement of the beam about the gross position for the purpose of displaying a symbol, for example. The minor deflection means 24 is responsive to corrected minor deflection signals ($x'$ and $y'$) which are applied thereto by a minor signal correction means 26. The minor signal correction means 26 is responsive to minor positioning signals ($x$ and $y$) applied thereto by signal source 28 which can, for example, comprise any one of several known symbol generators.

As a consequence of the gun 16 being positioned off-axis, the position of the beam on the tube face 14 will be distorted due to a keystone effect which will be described in greater detail hereinafter. In addition to the keystone distortion, the gross position of the CRT beam may further be distorted due to a pin cushion effect which results as a consequence of the radius of curvature of the tube face 14 being different from the beam length which generally can be considered as the distance from the beam deflection means to the tube face. The keystone and pin cushion distortion contribute to forming a composite distortion which is best illustrated in FIGS. 3 and 4. A first aspect of the present invention is directed toward the provision of the major signal correction means 20 for correcting the major positioning signals (X, Y) to develop major corrected deflection signals (X′, Y′) which cause the beam to trace a pattern substantially devoid of distortion.

Attention is now called to FIG. 2 which illustrates in positions (*a*), (*b*), and (*c*) respectively, the major horizontal beam positioning signal, the major vertical beam positioning signal, and a beam unblank signal which together in the absence of distortion should cause the beam to describe a plurality of parallel vertically spaced horizontal lines. More particularly, let it be defined that when the horizontal gross positoning signal shown in FIG. 2(*a*) is at a positive maximum (nominally illustrated as +3 volts) the beam is positioned at the left edge of the tube face 14 as seen by an observer. Also, let it be assumed that when the horizontal gross positioning signal is at a negative maximum (−3 volts), the beam is at the right edge of the tube face. Accordingly, application of a plurality of successive ramp signals as shown in FIG. 2(*a*) to the horizontal deflection means of the tube 10 should, in the absence of distortion, cause the beam to successively trace horizontal lines from the left to the right edge of the tube face.

By applying the major vertical beam positioning signal as shown in FIG. 2(*b*) to the vertical deflection means of the tube 10, in the absence of distortion, the horizontal beam movements caused by the signal of FIG. 2(*a*) should be vertically displaced from one another. More particularly, the major vertical positioning signal of FIG. 2(*b*) comprises a staircase waveform extending from a maximum negative potential (−3 volts) which will be assumed to place the beam at the top edge of the tube face 14 to a maximum positive potential (+3 volts), which will be assumed to place the beam at the lower edge of the tube face 14. FIG. 2(*c*) illustrates a series of beam blanking pulses for the purpose of blanking the beam during flyback between the right edge of one horizontal line and the left edge of the succeeding horizontal line.

In the absence of the keystone and pin cushion distortion mentioned the major positioning signals of FIG. 2 should cause the beam to describe the series of vertically spaced parallel horizontal lines shown dotted in FIG. 3. However, due to the composite effect of keystone and pin cushion distortion, the lines will appear as illustrated in solid form in FIG. 3. It will be noted that the solid lines toward the upper edge of the tube face are shorter than the solid lines toward the lower edge of the face. This is due primarily to the keystone effect which essentially distorts a rectangle as shown dotted in FIG. 4 into a trapezoid. The reason for the keystone distortion due to the off-axis gun should be apparent from a consideration of the geometry of the tube 10 as represented by FIG. 1. It should be clear that inasmuch as the lower edge of the tube face 14 is spaced further from the gun 16 than the upper edge of the tube face, the beam, given the same amount of initial deflection angle will diverge further thereby drawing longer lines at the bottom than at the top as represented in FIG. 3. The curvature distortion illustrated in FIGS. 3 and 4 is due to a composite effect of pin cushion and keystone distortion and results in the lines drawn at the top of the tube face having a greater curvature than the lines toward the bottom of the tube face. The reason for pin cushion distortion may also be understood from a consideration of the curvature of the tube face as compared to the beam length, and it should be apparent that pin cushion distortion would occur even if the gun 16 were located on the axis of the tube 10.

The major signal correction means 20 in accordance with the invention is therefore provided for the purpose of correcting the major positioning signals shown in FIGS. 2(*a*) and 2(*b*) in order to enable the horizontal dotted lines of FIG. 3 and the dotted rectangle of FIG. 4 to be described by the beam instead of the solid line patterns illustrated. From the representation of FIGS. 3 and 4 it will be recognized that the keystone distortion can be effectively corrected by increasing the magnitude of the X positioning signal as a function of the vertical position, or alternatively, reducing the magnitude of the X positioning signal as a function of the vertical position. A further alternative, of course, would be to increase the X signal for all points above the horizontal tube axis and reduce the X signal for all points below the horizontal axis. In any event, it should be apparent that in order to correct for the keystone distortion it is necessary to modify the magnitude of the X major positioning signal for any point defined by the X and Y major positioning signals by an amount ($\Delta X$) which is dependent upon the position of that point. As will be seen hereinafter, a correction signal ($\Delta X$) is developed by the correction means 20 responsive to the X and Y major positioning signals. This correction signal ($\Delta X$) is utilized to correct the horizontal major positioning signal (X) to develop a corrected horizontal deflection signal (X′) which is then applied to the major deflection means 18.

It should also be recognized from FIGS. 3 and 4 that in order to correct for the curvature distortion the Y positioning signal of any point should be altered by an amount ($\Delta Y$) which is dependent upon the horizontal and vertical position of the point. Thus, from FIG. 4 it should be apparent that the Y major positioning signals should be increasingly modified as the absolute magnitude of horizontal deflection increases. Also, it should be apparent that the Y major positioning signal should be reduced by a greater amount for points toward the upper edge of the tube face than for points toward the lower edge of the tube face.

Attention is now called to FIG. 5 which comprises a block diagram of the major signal correction means 20 of FIG. 1. The apparatus of FIG. 5 includes an analog multiplier 34 which is responsive to the X and Y major positioning signals of FIGS. 2(*a*) and 2(*b*) for developing a correction signal which is then utilized to correct the major positioning signals (X and Y) to develop corrected deflection signals (X′ and Y′) for application to the deflection means 18 of FIG. 1.

More particularly, the apparatus of FIG. 5 is comprised of first and second level shifting networks 36 and 38 to which are respectively applied the X and Y major positioning signals of FIGS. 2(*a*) and 2(*b*). Network 36 develops a sawtooth waveform (FIG. 6(*a*)) in which the ramp portions extend from, for example, +4 volts to +6 volts corresponding to the +3 volts to −3 volt ramps of FIG. 2(*a*). The level shift network 38 develops the staircase waveform shown in FIG. 6(*b*) from the waveform of FIG. 2(*b*) which it will be noted varies from +2.5 volts to .5 volt.

It should be noted that this system is used for random CRT beam positioning and that the signals portrayed herein are illustrative in nature only. It is pointed out that the quantitative voltages mentioned herein are exemplary only and embodiments of the invention can, of course, utilize voltages of considerably different magnitude and polarity. In addition, it is emphasized that the level shift networks 36 and 38 illustrated in FIG. 5 are conventional and are provided only for the purpose of enabling the exemplary waveforms of FIGS. 2(*a*) and 2(*b*) to operate with the specific embodiment of the invention to be disclosed in FIG. 8. It should, of course, be readily recognized by those skilled in the art that embodiments of the invention could be constructed in which the analog multiplier 34 could directly handle the major positioning signals of FIG. 2(*a*) and 2(*b*).

The analog multiplier 34 is comprised of a differential amplifier 40 having a first input terminal 42 to which the output of the level shift network 38 is applied. Additionally, the differential amplifier 40 has an output terminal 44 which is coupled through a variable impedance ratio feedback network 46 to a second input terminal 48. The variable feedback network 46 in accordance with the preferred embodiment of the invention to be discussed in conjunction with FIGS. 7 and 8 is controlled by the output of the level shift network 36.

The output of the level shift network 36 by controlling the variable feedback network 46 effectively controls the closed loop gain of the amplifier 40. The output of the multiplying amplifier 40 is represented by the waveform illustrated in FIG. 6(*c*) wherein it will be recognized that the magnitudes of the ramps decrease as the level of the signal provided by network 38 decreases, or in other words, as the beam moves lower on the tube face.

The output of the amplifier 40 is applied to the input of a summing amplifier 50 together with the Y positioning signal of FIG. 2(*b*). Assuming proper scaling, polarity inversion and level shifting, the amplifier 50 will provide the output signal represented in FIG. 6(*d*) which it will be recognized is similar to and has the same polarity as the X positioning signal of FIG. 2(*a*) but is different therefrom in that the magnitudes of the ramps are successively decreasing as the level of the Y positioning signal of FIG. 2(*b*) increases, or in other words as the beam moves vertically downward on the tube face. The correction signal shown in FIG. 6(*d*) and provided by the amplifier 50 of FIG. 5 is applied to the input of a summing amplifier 52. Additionally, the X positioning signal of FIG. 2(*a*) is applied to the input of amplifier 52. Thus, the amplifier 52 corrects the X positioning signal by adding thereto the correction signal of FIG. 6(*d*) provided by amplifier 50 to obtain the corrected deflection signal X′ shown in FIG. 6(*g*). Appropriate scaling factors are, of course, introduced by amplifier 52.

From the foregoing, it should be appreciated that the magnitude of horizontal deflection signal decreases as demonstrated by the waveform of FIG. 6(*g*) as the beam moves vertically lower on the tube face 14. As a consequence, the keystone distortion illustrated in FIGS. 3 and 4 will be eliminated in that, assuming appropriate scaling, all of the horizontally drawn lines will be of the same length. Likewise, any point on one of these lines (hence, any place on the CRT face) will occupy its proper horizontal position as addressed by the positioning input signals.

It will be apparent that in order to eliminate the curvature in the solid lines of FIGS. 3 and 4 it is necessary to modify the vertical deflection. It should be apparent from FIGS. 3 and 4 that the amount of vertical deflection correction required for any point is dependent on both its horizontal and vertical coordinates. Inasmuch as the pattern of FIGS. 3 and 4 is symmetrical about the vertical axis, the amount of vertical deflection correction required can be said to be dependent upon the absolute value of its horizontal or X position; i.e., independent of whether the position is to the right or left of the vertical axis. As has been previously stated and as is apparent in FIG. 4, it is necessary to introduce a greater amount of vertical deflection correction for beam positions toward the upper end of the tube face than toward the lower end.

The corrected vertical deflection signal Y′ shown in FIG. 6(*f*) is provided by the summing amplifier 60. The first input to the summing amplifier 60 is, of course, the vertical major positioning signal Y of FIG. 2(*b*). The second input to the amplifier 60 is shown in FIG. 6(*e*) and is derived from the output of an absolute amplifier 62 which provides a positive output signal regardless of the polarity of the input signal. The input to the amplifier 62 is connected to the movable tap of a potentiometer 64 connected between the output of the summing amplifier 50 and a line providing the horizontal positioning signal X shown in FIG. 2(*a*).

It should be apparent that the signal provided by the amplifier 62 to the summing amplifier 60 is substantially proportional to the horizontal coordinate of the beam position and consequently can be used to introduce the increasing amount of vertical correction required as the absolute horizontal displacement increases from the vertical axis. The potentiometer 64 enables the signal provided by the absolute amplifier 62 to introduce different amounts of correction dependent upon the vertical displacement of the beam from the horizontal axis. In order to appreciate this, consider initially that the tap of the potentiometer 64 is in its lower extreme position so that the absolute amplifier 62 sees only the horizontal major positioning signal of FIG. 2(*a*). In this event, the correction signal provided to the amplifier 60 will correct the vertical major positioning signal Y for different values of horizontal displacement but will not introduce any variation for different values of vertical displacement as is apparently required by the patterns of FIGS. 3 and 4. However, assume now that the movable tap of potentiometer 64 is moved upwardly so that the correction signal provided by amplifier 50 contributes to the input to amplifier 62. As a consequence, it will be apparent that the input to the amplifier 62 will decrease as the beam position moves downwardly on the tube face. Thus, the absolute amplifier 62 will provide the waveform of FIG. 6(*e*) which it will be noted is comprised of substantially triangular peaks of decreasing amplitude. As a consequence, the correction of the vertical major positioning signal occurring in the amplifier 60 decreases as the beam position moves vertically down the tube face 14. The output signal from amplifier 60 is shown in FIG. 6(*f*) in which the decreasing correction can be noted.

Attention is now called to FIG. 7 which illustrates a block diagram of the analog multiplier 34 of FIG. 5 in greater detail. As noted, the multiplier 34 includes a differential input amplifier 40 having a first (+) input terminal 42, an output terminal 44, and a second (−) input terminal 48. As illustrated, the output terminal 44 is connected through an impedance $Z_A$ to the junction 70 of a plurality of parallel impedance paths which respectively include impedances $Z_1$, $Z_2$, $Z_3$, and $Z_4$. The junction 70 is connected to the input terminal 48 of amplifier 40.

A different switch means is connected in series in each of the parallel impedance paths. Thus, switch means $S_1$ is connected in series with impedance $Z_1$ and switch means $S_2$–$S_4$ are respectively connected in series with impedances $Z_2$–$Z_4$. All the switch means are connected to a source of reference potential nominally illustrated as ground 72. Each of the switch means $S_1$–$S_4$ is provided with a control input terminal 74 to which a control signal (horizontal major positioning signal X) is applied through a different threshold means $T_1$–$T_4$. Thus, the positioning signal applied to control input terminal 76 is coupled through a threshold circuit $T_1$ to the switch means $S_1$. Similarly, the control input terminal 76 is connected through threshold circuit $T_4$ to the switch means $S_4$. Each of the threshold means $T_1$–$T_4$ defines a different threshold conduction level. Consequently, as the signal applied to the control terminal 76 increases, the switch means $S_1$–$S_4$ become successively conductive. As a consequence, the composite impedance of the parallel impedance branches to ground is reduced as the potential on the control terminal 76 is increased. Therefore, assuming a constant input potential $E_{IN}$ at terminal 42, the feedback potential $E_{FB}$ at input terminal 48 decreases as signal X increases which in turn, of course, means that the gain of the differential amplifier 40 increases. Thus, by utilizing the positioning signal X to control the gain of the amplifier to which the positioning signal Y is applied, the output signal $E_{OUT}$ at terminal 44 will be substantially proportional to the product of the positioning signals X and Y. As previously mentioned, this product is represented by the waveform of FIG. 6(*c*).

In order to understand the operation of the analog multiplier 34 of FIG. 7 better, let $Z_N$ represent the composite impedance of parallel impedances $Z_1$–$Z_4$ for the number of switch means conducting. Then, $$E_{FB}=\frac{Z_N}{Z_N+Z_A}\cdot E_{OUT}$$

For a differential amplifier $E_{OUT}=A(E_{IN}-E_{FB})$ where A represents the open loop gain of the amplifier. Therefore, $$E_{OUT}=A\left[E_{IN}-\left(\frac{Z_N}{Z_N+Z_A}\right)E_{OUT}\right]=\frac{AE_{IN}}{1+\frac{AZ_N}{Z_N+Z_A}}$$

Assuming that $$\frac{AZ_N}{Z_N+Z_A}=\gg 1$$

Then $$\frac{E_{OUT}}{E_{IN}}=\frac{Z_N+Z_A}{Z_N}$$

Accordingly, if $Z_1=Z_2=Z_3=Z_4=10Z_A$, the gain $$(E_{OUT}/E_{IN})$$

can be varied from 1.0 to 1.1 to 1.2 to 1.3 to 1.4 as the switch means $S_1$–$S_4$ are successively closed in response to an increasing potential applied to control terminal 76.

Attention is now called to FIG. 8 which schematically illustrates a preferred circuit embodiment of the analog multiplier illustrated by block diagram in FIG. 7. In the embodiment of FIG. 8, the output terminal 44 is connected through a resistor 78 to a junction point 80 which in turn is connected to the second input terminal 48 of the differential amplifier 40. Resistors 82, 84, 86, and 88 corresponding to impedances $Z_1$–$Z_4$ in FIG. 7 are connected to the junction 80. The emitter collector paths of NPN transistors Q1, Q2, Q3, and Q4 corresponding to switch means $S_1$–$S_4$ of FIG. 7 are respectively connected in series with the resistors 82, 84, 86, and 88. The collector of each of the transistors is connected to a reference potential, herein shown as ground. A diode 90 connects the collector of each transistor to the base thereof.

The previously referred to control terminal 76 is connected through a different threshold circuit means to each of the bases of transistors Q1–Q4. Thus, control terminal 76 is connected through resistor 92 to the base of transistor Q1 and through diode 94 and resistor 96 to the base of transistor Q2. Similarly, the control terminal 76 is connected through serially connected diodes 94 and 98 and resistor 100 to the base of transistor Q3 and through serially connected diodes 94, 98, 102 and resistor 104 to the base of transistor $Q_4$.

In addition, the base of each of the transistors is connected to a different voltage divider circuit connected between the output terminal 44 of differential amplifier 40 and a source of negative potential 106. Thus, the base of transistor $Q_1$ is connected to a junction between variable resistor 108 and fixed resistor 110. Similarly, each of the other transistor bases is connected to the junction between a variable resistor and a fixed resistor connected in series between the differential amplifier 44 and the source of negative potential 106.

As previously pointed out, the vertical positioning signal Y (FIG. 2(*b*)) is applied to differential amplifier input terminal 42 and the horizontal positioning signal X (FIG. 2(*a*)) is applied to the control terminal 76.

In operation, with a low positive or negative input applied to the bases of the transistors $Q_1$–$Q_4$, the transistors will not conduct and the differential amplifier 40 will essentially operate as a unity gain follower. However, as the horizontal positioning signal X applied to control terminal 76 increases in the positive direction the transistors $Q_1$–$Q_4$ will gradually and successively be switched on. The diodes 94, 98, and 102 establish different threshold levels at which the transistors $Q_2$–$Q_4$ begin to switch on. As each transistor is switched on the gain of the amplifier 40 increases from 1.0 to 1.4 as previously described.

In many applications specifically contemplated for the analog multiplier of FIG. 8, a high frequency response is essential meaning that the impedances $Z_1$–$Z_4$ of FIG. 7 or the corresponding resistors of FIG. 8, must be switched in and out at a very high rate. On the other hand, it is desired that the transition between the gain steps from 1.0 to 1.4 be gradual. In order for the gain steps to be gradual, high impedances would be required in the base drive circuitry to each transistor. However, the utilization of high impedances in the base drive circuitry results in slower switching speeds.

In order to avoid the necessity of utilizing high impedances in the base drive circuitry while still permitting the gain steps to be gradual, it is desirable to employ transistors having a low beta where beta, of course, represents the ratio of the emitter current to the base current. In order to achieve a sufficiently low beta, the transistors $Q_1$–$Q_4$, as should be apparent in FIG. 8, are connected so as to conduct current therethrough in a reverse direction; i.e., from emitter to collector. As an example, planar silicon epitaxial transistors having a beta approximately equal to 0.1 can be utilized. By connecting the transistors in inverted fashion as illustrated in FIG. 8, a significant amount of base current is required to switch the transistors on. Therefore, as the voltage applied to the control terminal 76 is gradually increased, the impedance looking into the transistor collectors, which is in series with the feedback resistor 78 to ground, gradually changes from the turned off impedance to saturation impedance. This gradual switching results in a smooth gain transition while maintaining a flat frequency response to a very high frequency.

By operating the transistors in the inverted mode as shown in FIG. 8, an additional advantage gained is that the off-set voltages are extremely small. It is further pointed out that inasmuch as the beta of the transistors is low, it is desirable to feed a signal proportional to the collector current of the transistors back to the bases thereof. Since the output signal of the amplifier 40 will be substantially proportional to the collector current of the transistors, it is connected to the bases of the transistors through the variable impedances 108. A different variable impedance 108 is connected to each of the transistor bases in order to compensate for variations in the characteristics of the different transistors.

The function of the diodes 90 is to prevent the bases of transistors $Q_2$–$Q_4$ from undergoing a large signal which could capacitively couple through the base emitter junction and through the amplifier 40 to the output terminal 44.

From the foregoing it should be appreciated that apparatus has been disclosed herein for correcting major vertical and horizontal CRT beam positioning signals for compensating for keystone and pin cushion distortions introduced as a consequence of the tube geometry. The major signal correction apparatus utilizes a unique analog multiplier which performs multiplication essentially by enabling one of the input signals to vary the gain of an amplifier to which the second input signal is applied.

It should be appreciated that the foregoing portion of the specification referring to FIGS. 2–8 is directed to correcting the major or gross positioning of the CRT beam and aside from some early introductory comments, little has been said thus far pertaining to the minor distortion which arises as a consequence of the tube geometry. More particularly, it should be clear that even if the major positioning signals are properly corrected, this merely means that the symbol will be displayed at the desired gross position. However, due to the fact that the minor or symbol signals do not pass through the major signal path, as should be clear from FIG. 1, the shape of the symbols will be distorted by substantially the same effects, primarily keystone, previously discussed with reference to the major positioning signals unless the minor signals are also corrected. In accordance with the present invention, the minor positioning signal X is corrected by the correction means 26 of FIG. 1 to develop the minor horizontal deflection signal X′ which is applied to the minor deflection means 24.

In order to understand the minor distortion introduced by the CRT geometry, attention is now called to FIG. 9 which illustrates a plurality of symbols 120, each drawn in response to identical minor positioning signals $x$, $y$ and each displayed at a different gross position on the tube face 14. From FIG. 9 two primary distortion characteristics should be apparent; initially, as the absolute horizontal displacement of a symbol from the vertical axis increases, it is subjected to a greater amount of skew for leaning toward the vertical axis, and secondly, as the vertical displacement of a symbol from the upper edge of the tube increases the width of the symbol likewise increases. It should be apparent that both the skew and width minor distortion are attributable to the previously described keystone effect. As will be shown hereinafter, the correction means 26 (FIG. 1) modifies the minor positioning signal $x$ provided by source 28 to develop a minor horizontal deflection signal $x'$ which eliminates the skew and width distortion and would thus display all of the symbols of FIG. 9 as identically shaped rectangles.

From a more detailed consideration of FIG. 9 it will be seen that in order to eliminate skew the corrected deflection signal $x'$ should be a function of the absolute horizontal gross displacement of the symbol, i.e., X′, and the minor vertical displacement $y$. Thus, in order to eliminate skew distortion the corrected deflection signal $x'=f(X'y)$. This relationship expresses what has been stated previously that the correction required in the signal $x$ increases as the gross horizontal displacement X′ increases and as the minor vertical displacement $y$ increases.

In order to eliminate the minor width distortion, the signal $x$ should be corrected based upon the minor horizontal displacement $x$ and the vertical gross displacement Y. Thus, $x'=f(x, Y)$. This relationship expresses, for example, that more correction is required as the magnitude of Y increases. Also, of course, a greater correction is required as the magnitude of signal $x$ increases.

Thus, correction means 26 provides a deflection signal $x'$ which corrects for both shew and width distortion and can be expressed as signal $x'=f(X'y)+g(xY')$. Prior to considering the details of a preferred implementation of correction means 26 it is pointed out that other forms of minor signal distortion may occur but normally this additional distortion will be so small that special circuitry to eliminate it is probably not justified even where extremely high quality displays are required. For example, as should be recognized from the previously discussed major signal pin cushion distortion, the symbols displayed at the top of the tube face may have a height different from those positioned toward the bottom. It has been found, however, that slight height variations are hardly noticeable to the observer.

Attention is now called to FIG. 10 which illustrates a preferred implementation of the correction means 26 for providing the signal $x'$. As pointed out, in order to develop the skew correction, a signal which is a function of signals X′ and $y$ is required. In the preferred implementation shown in FIG. 10, such a signal is developed by applying the signal X′ across a variable impedance circuit 130 and controlling the impedance in accordance with the signal $y$. The variable impedance circuit 130 shown in FIG. 10 is comprised of a resistor 132 connected in series with the drain-source path of a field effect transistor 134. More particularly, the line 136 providing the signal X′ is connected to the first terminal of resistor 132 whose second terminal is connected to the source electrode of transistor 134. The drain electrode is connected to a source of reference potential, e.g., ground. The uncorrected minor vertical positioning signal $y$ is properly level shifted and applied to the gate electrode of transistor 134. Conductor 138 connects the source electrode of transistor 134 to a first input terminal of summing amplifier 140.

It is well known that at low drain-source potentials, the impedance between the drain and the source varies nearly linearly as a function of the gate potential. As a consequence, the potential appearing on terminal 138 varies substantially proportionally to variations in the applied analog signals X′ and $y$. Thus, the variable impedance circuit 134 can properly be considered an analog multiplier.

As previously pointed out, the amount of minor horizontal correction required for width distortion is a function of signals X and Y′. A signal proportional to these variables can, of course, be developed by a variable impedance circuit 142 which can be identical to the circuit 130. The signal $x$ is applied to the source electrode of transistor 144 through resistor 146 and the signal Y′, properly level shifted, is applied to the gate electrode. Line 148 connects the source electrode to the summing amplifier 140 which thus provides the corrected horizontal minor deflection signal $x'$ as a function of $X'y$ and $xY'$.

From the foregoing it should now be appreciated that means have been shown herein for correcting both major and minor beam positioning signals prior to their application to a CRT deflection means in order to eliminate distortions which would otherwise be introduced due to the CRT geometry.

The embodiments of the invention in which an exclusive property or privilege is claimed are defined as follows:

1. In combination with (1) a cathode ray tube having a beam producing gun displaced from the horizontal tube axis and (2) sources of horizontal and vertical major positioning signals for randomly defining gross positions on the tube face and (3) sources of horizontal and vertical minor positioning signals for describing a symbol pattern to be displayed at one of said gross positions, apparatus responsive to said vertical and horizontal major and minor positioning signals for developing corrected vertical and horizontal major and minor deflection signals to compensate for keystone and other distortion attributable to said off-axis gun and other features of the tube geometry, said apparatus comprising:

means for multiplying said horizontal and vertical major positioning signals for developing a correction signal;

means responsive to said correction signal for modifying said horizontal positioning signal to develop said horizontal deflection signal;

means responsive to said correction signal and said horizontal positioning signal for modifying said vertical positioning signal to develop said vertical deflection signal; and means responsive to said major deflection signals and said minor positioning signals for developing a corrected horizontal minor deflection signal.

2. The apparatus of claim 1 wherein said multiplication means includes a differential amplifier having first and second input terminals and an output terminal;

variable impedance means coupling said output terminal to said first input terminal;

means for coupling said vertical positioning signal to said second input terminal; and means responsive to said horizontal positioning signal for controlling said variable impedance means.

3. The apparatus of claim 1 wherein said means for developing said corrected horizontal minor deflection signal includes minor analog multiplication means responsive to said horizontal major deflection signal and said vertical minor positioning signal.

4. The apparatus of claim 3 wherein said means for developing said corrected horizontal minor deflection signal includes minor analog multiplication means responsive to said horizontal minor positioning signal and said vertical major deflection signal.

5. The apparatus of claim 4 wherein said minor analog multiplication means comprises a circuit branch including a variable impedance;

means establishing a potential across said circuit branch in accordance with said horizontal major deflection signal; and means for controlling said variable impedance in accordance with said vertical minor positioning signal.

6. The apparatus of claim 5 wherein said variable impedance comprises a field effect transistor.

References Cited

UNITED STATES PATENTS

| | | | |
|---|---|---|---|
| 2,344,736 | 3/1944 | Schade | 178—7.2 |
| 3,005,148 | 10/1961 | Salomonsson | 307—317 |
| 3,088,671 | 5/1963 | Chase | 235—194 |
| 3,191,017 | 6/1965 | Miura | 235—194 |
| 3,293,424 | 12/1966 | Fisher | 235—194 |
| 3,308,334 | 3/1967 | Bryson. | |

JOHN W. CALDWELL, Primary Examiner

HOWARD W. BRITTON, Assistant Examiner

U.S. Cl. X.R.

235—194; 315—27